United States Patent Office 3,113,598
Patented Dec. 10, 1963

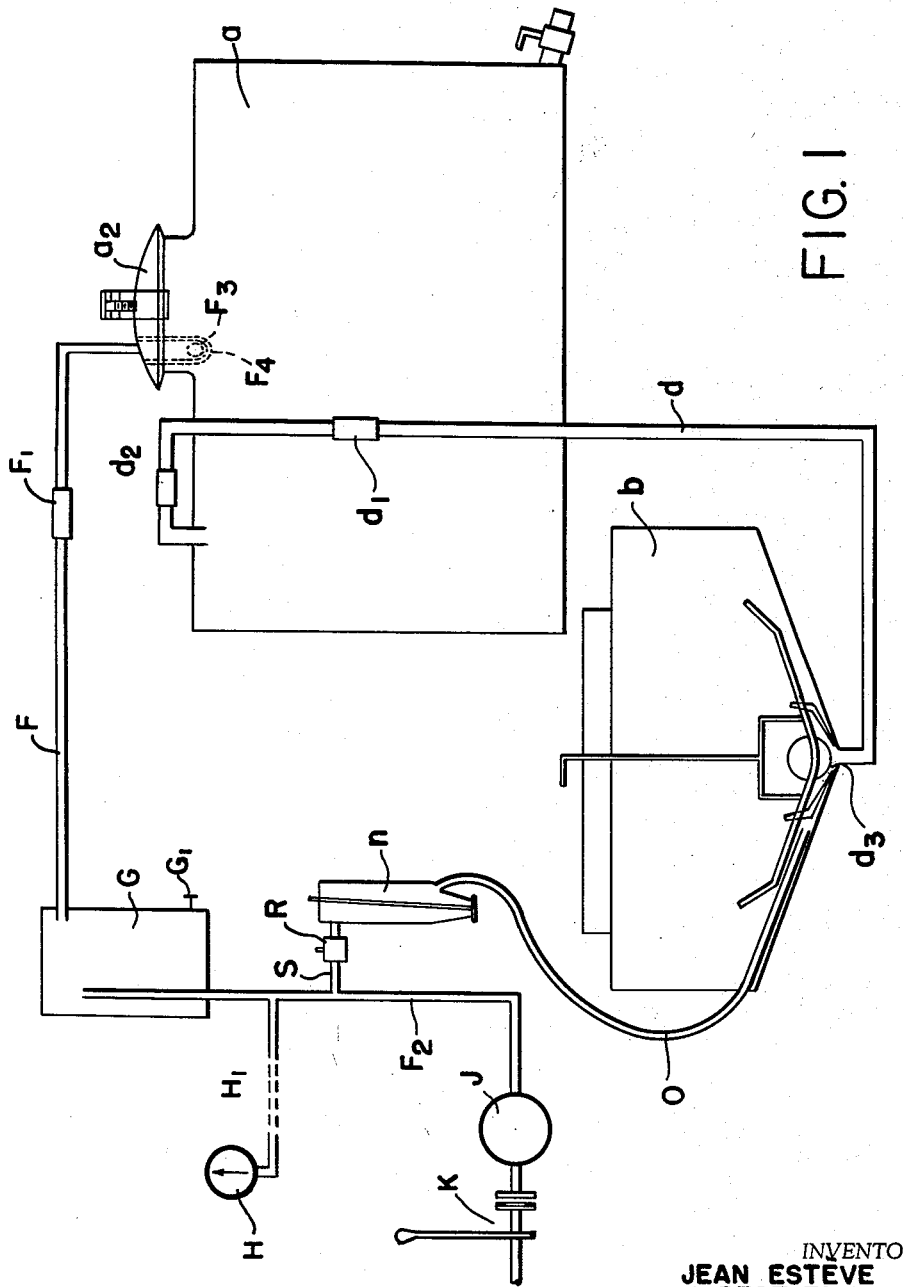
FIG. I

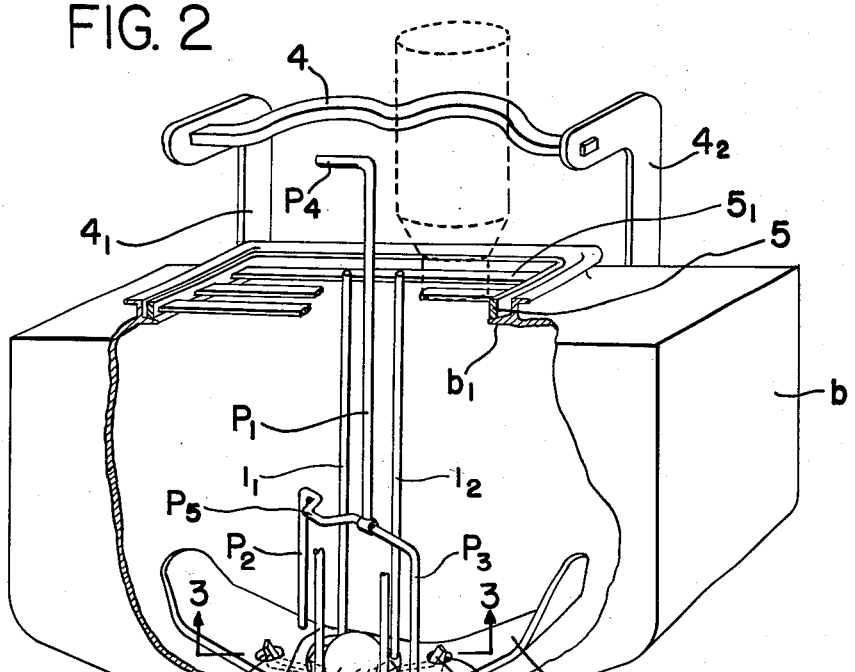
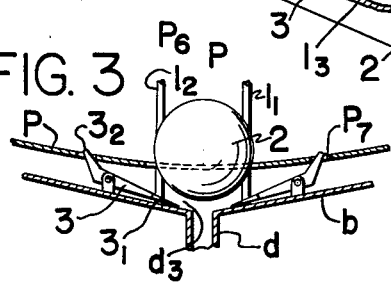
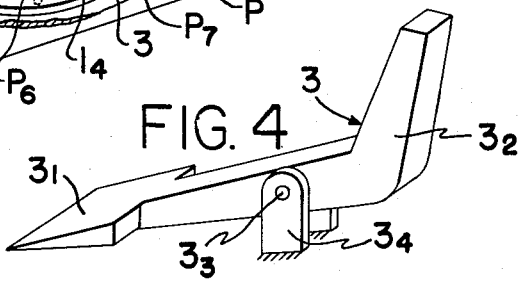
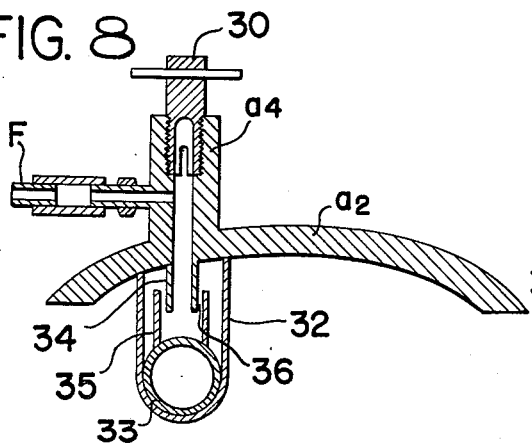

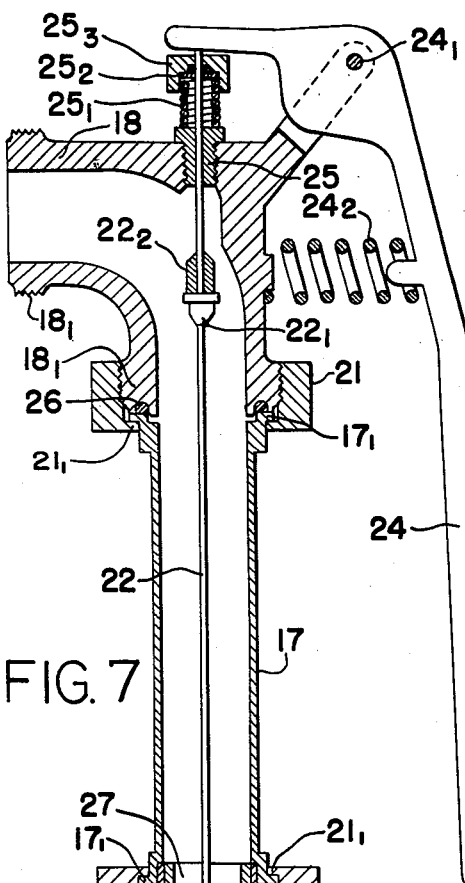
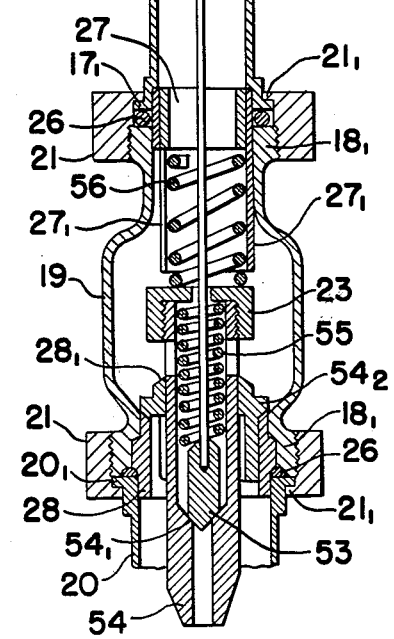
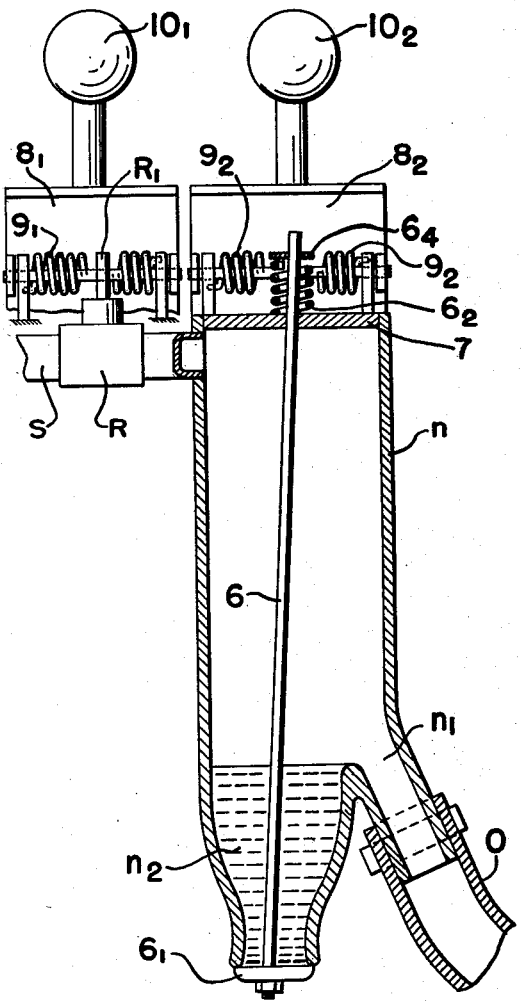
FIG. 5
FIG. 7

3,113,598
COLLECTING MILK BY VACUUM BY MEANS OF TRUCKS FITTED WITH SPECIAL EQUIPMENT AND A BODY ADAPTED TO THIS PRINCIPLE
Jean Estève and Hubert Triballat, Rians (Cher), France
Filed Feb. 15, 1961, Ser. No. 89,526
7 Claims. (Cl. 141—59)

The present invention relates to improvements in trucks for collecting milk comprising a tank in which a sufficient vacuum is created so that milk, when poured from a container at a lower level than that of the tank, is forced inside the tank under the action of atmospheric pressure.

With regard to this device, the present invention has the purpose of producing a vehicle for collecting milk by a vacuum that is automatic and which enables samples of milk to be taken that are representative of the milk contained in the receiving container of the apparatus.

Another purpose of the invention is to produce a receiving container for receiving milk in which a discharge pipe is automatically closed as soon as the receiving container is empty, so as to prevent air from penetrating into the tank.

Another purpose of the invention is to provide a ball for closing the discharge aperture in the receiving container which can be lifted and opened by a mixing paddle in the receiving container so as to impart a great simplicity of embodiment and operation in the collecting vehicle.

Another purpose of the invention is to prevent at all times the liquid contained in the tank from penetrating into the air suction duct which draws a vacuum in the tank and particularly when the tank is full of milk.

Another purpose of the invention is to produce a sampling device, operating under a vacuum which at any moment enables a uniform quantity of milk to be taken from the receiving container for carrying out various inspection operations on the milk.

Another purpose of the invention is to facilitate the pouring of milk cans into the receiving container.

Another purpose of the invention is to produce on the milk collecting truck equipment preventing the vacuum in the collecting tank from reaching an exaggerated value which might rupture the tank.

Another purpose of the invention is to automatically cut off the suction of air from the tank when the vacuum in the tank reaches a predetermined value by closing the tank-pump ducts and putting the pump into communication with the outside air.

Another purpose of the invention is to produce equipment which automatically puts the suction into operation according to the amount of vacuum inside the tank.

Another purpose of the invention is to provide controlling devices for indicating to the operator at all times the amount of vacuum inside the tank.

Other purposes and advantages will be revealed by the following description and the attached drawings in which:

FIG. 1 is a schematic diagram illustrating a milk collecting device of the present invention;

FIG. 2 is a cut-away perspective view of a milk receiving container of the device of FIG. 1;

FIG. 3 is a partial sectional view of the receiving container of FIG. 2 taken substantially along line 3—3 thereof;

FIG. 4 is a perspective view of a paddle of the device of FIGS. 2 and 3 for enabling a ball which closes the milk intake duct in the receiving container to be raised to open the duct;

FIG. 5 is a sectional view of a receptacle used in the device of FIG. 1 for taking samples of milk;

FIG. 7 is an enlarged sectional view of the suction control valve of FIG. 6;

FIG. 8 is an enlarged sectional view of the tank cap assembly of the tank illustrated in FIGS. 1 and 6; and FIG. 9 is a perspective view of a control handle for operating the assembly of FIG. 8.

Figure 6:
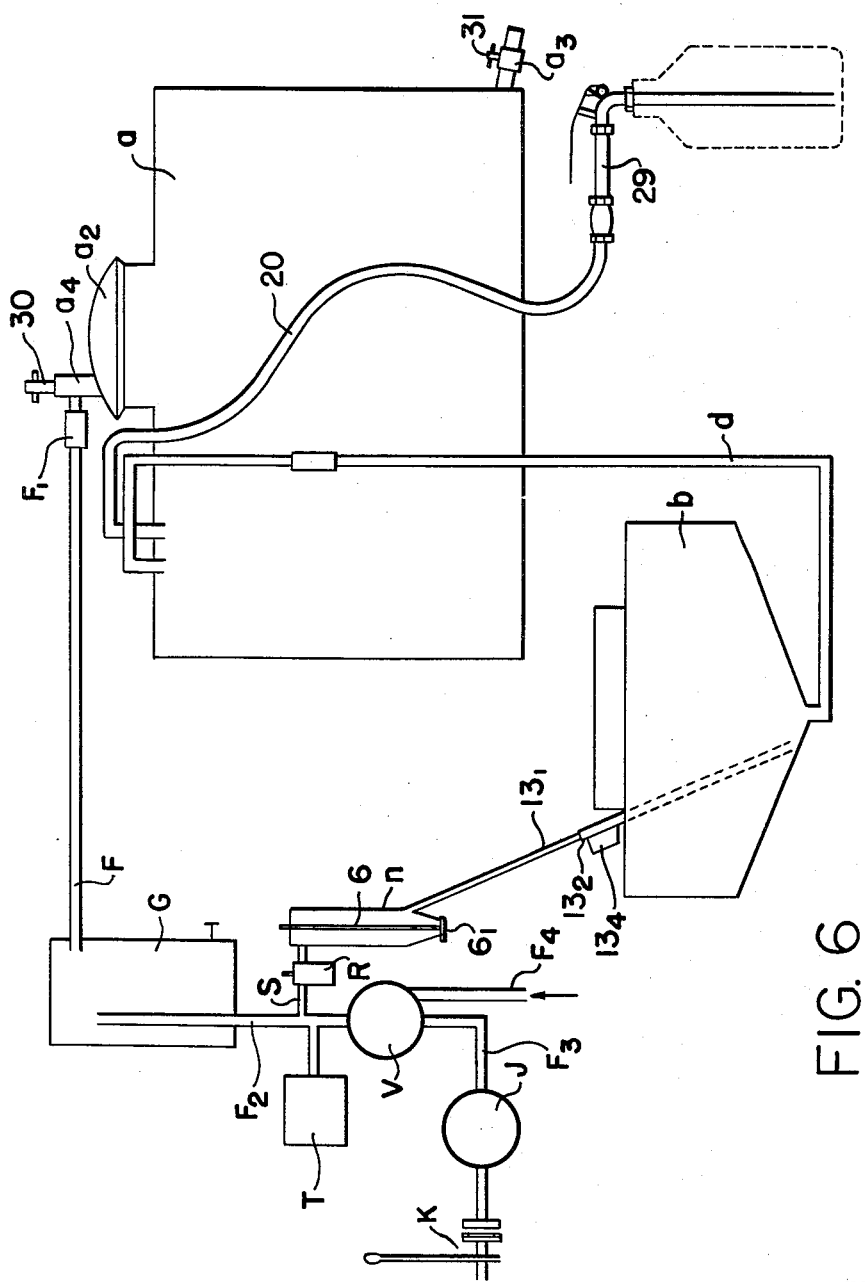
FIG. 6 is a schematic diagram of the milk collecting device of FIG. 1 which is additionally provided with a suction control valve for collecting milk from tanks.

The device shown in FIG. 1 consists of a tank $a$ with a pipe F at the top which is connected to the vacuum pump J. A pipe $d$ is connected from the top of the tank to the bottom part of a milk receiving container $b$.

These pipes F and $d$ are made in two or more pieces joined by sleeves $F_1$ and $d_1$ constructed of flexible material for preventing the propagation of vibrations set up by the truck and also for preventing the various solders or pipe joints from breaking under the stress exerted by these vibrations.

On the other hand, an indicator $d_2$ of glass or transparent plastic material is placed in the pipe $d$ for matching the flow of milk into tank $a$.

In the pipe F connected to the vacuum pump J there is a receptacle G inserted which is provided with a draincock $G_1$ for preventing condensation water from penetrating into the pump J.

Also, a float $F_3$ is maintained by guides $F_4$ below the aperture of the pipe F emerging into the tank $a$ for preventing the milk from penetrating into the pipe F especially when the tank is full of milk.

A pipe $F_2$ connects the pump J to the receptacle G and there is a pipe $H_1$ which connects the pipe $F_2$ to a manometer H placed, for example, in the cab of the truck so as to indicate at any moment the amount of vacuum inside the tank.

The pump J is actuated from the output shaft of the gear box of an engine by a Cardan shaft on which a clutch device is mounted enabling the pump J to be started up by means of the lever K.

A receptacle $n$ connected, on the one hand, by a flexible duct O to the receiving container $b$, and on the other, by piping S to the duct $F_2$, enables samples of milk of uniform quantity to be taken from the receiving container $b$ in order that samples of milk can be subjected to various inspection operations.

Inside the receiving container $b$, as is shown in FIG. 2, is a mixing paddle P to which a rod $P_1$ is fixed. The rod $P_1$ is provided with a handle $P_4$ at its upper part.

This rod $P_1$ is connected to the paddle P by means of a two-way fork having legs $P_2$ and $P_3$. The paddle P has an aperture $P_6$ in its center, inside of which four guides, $1_1$, $1_2$, $1_3$ and $1_4$ are placed. These guides serve to guide the movement of a ball 2 which can move vertically up and down within the guides to open and close a port $d_3$ at the bottom of the container $b$ which is in communication with the pipe $d$.

This paddle P also has two apertures $P_7$ which are diametrically opposed in relation to central aperture $P_6$. The apertures $P_7$ accommodate the upper ends of levers 3. The levers 3 are diametrically opposed in relation to the port $d_3$ in the bottom of the container $b$ and are hinged on axles $3_3$ which are pivotally mounted on straps $3_4$ welded to the bottom of the receiving container $b$. These levers 3 each comprise a beveled tongue $3_1$ at their inner ends for enabling the closing ball 2 to be raised from the port $d_3$.

The other ends of the levers 3 are curved upwardly forming the legs $3_2$ which normally extend into the apertures $P_7$ in the mixing paddle P. Thus, when it is required to mix the milk contained in the receiving container, it is only necessary to impart a vertical movement to the paddle by means of the handle $P_4$.

After mixing and sampling of the milk have been carried out, the handle $P_4$ is rotated axially until a stop $P_5$ presses against the guide $1_3$; then the paddle P is lowered. At this moment the paddle P presses on the outer ends $3_2$ of the levers 3, which causes the ball 2 to lift, opening the port $d_3$ in the bottom of the container b, allowing atmospheric pressure to force the milk therein into the tank a because of the vacuum created in the tank by the pump J. When the ball 2 is lifted by the levers 3, it rises to the surface of the milk, and when the milk is gone from the container b the ball again seats, closing the port $d_3$.

The guides $1_1$, $1_2$, $1_3$ and $1_4$ are fixed by their top part to a part 5 which is supported on the lugs $b_1$ attached to the rim of an upper aperture in the receiving container b. This part 5 is provided with crossbars $5_1$ which form a grating across the upper opening of the receiving container b for enabling the milk cans to be supported while they are being emptied into the container b. On the other hand, a rack 4 with several curvatures is fixed above the opening of the receiving container by two uprights $4_1$ and $4_2$, enabling the milk cans to be supported laterally during pouring.

As can best be seen in FIG. 5, a receptacle n for enabling milk samples to be taken is provided which is closed at its top by a lid 7. The receptacle n has two openings at its lower end, one $n_1$ of which is in communication with the receiving container b by a flexible duct O made of rubber or plastic material, and the other $n_2$ being closed by a valve $6_1$, which valve is fixed to the lower end of a rod 6. The rod 6 passes through the lid 7 and has a washer $6_4$ at its upper end, below which there is a spring $6_2$ for holding the valve $6_1$ against the opening $n_2$ of the receptacle n. At the top part of the receptacle, a duct S is connected having its other end connected to the inlet duct $F_2$. A cock R is positioned in the duct S for enabling a vacuum to be drawn in the receptacle n. A button $R_1$ is provided for opening the cock R, thus connecting the receptacle n to the vacuum pump J and thereby causing a sample of milk to be drawn into the receptacle n.

Control levers $10_1$ and $10_2$ fixed on hinged plates $8_1$, $8_2$ which are pivoted about horizontal axes are provided with recoil springs $9_1$, $9_2$ for keeping the levers normally vertical. When the lever $10_1$ is pulled downward the hinge plate $8_1$ pushes downward on the spindle $R_1$ of the cock R, opening the cock and drawing milk into the receptacle n. This lever is then released when enough milk for a sample is obtained closing the cock R. The lever $10_2$ is then pulled down and the hinge plate $8_2$ pushes on the top of rod 6 opening the valve $6_1$ so as to allow the milk which has accumulated in the part of the receptacle n placed below the opening $n_1$ to flow out the valve $6_1$ into a container for testing. When the lever $10_2$ is released, the valve $6_1$ is closed and a new milk sample can be drawn into the receptacle n. Thus, after the milk placed in the receiving container b has been mixed with paddle P, the sampling device n enables a uniform quantity of milk to be sampled.

In the drawings shown in FIG. 6 the tank a is connected, on the one hand, to the receiving container b through a duct d and, on the other, to a pump J through a duct F.

In the duct F connecting the pump to the tank, a receptacle G is inserted which prevents condensation water or milk from penetrating to the pump J.

A sampling receptacle n is also connected by a duct S to the duct $F_2$ going towards the pump. Members T and V are also connected to the duct $F_2$ to enable the vacuum in the tank to be controlled to a predetermined value without the risk of rupture of the tank.

These members T and V consist of a pressostat T connected to the duct $F_2$ and an electro-gate V inserted in the duct $F_2$. The pressostat T and the electro-gate V are arranged in a suitable manner, as is known to those skilled in the art, so that the vacuum pump J may be shut off when the vacuum in tank a reaches a maximum level, and so that the pump J may be reactivated when the vacuum falls below a certain set level.

The receiving container b, into which the cans of milk are poured, is connected to a sampling receptacle n which is itself connected by a duct S to the intake duct $F_2$.

A cock R is also inserted in the duct S so as to be able to control the intake of a small quantity of milk into the sampling receptacle n.

The inlet $n_1$ is connected to the receiving container b by means of the telescopically mounted ducts $13_1$ and $13_2$.

The second telescopic duct $13_2$ is provided with an operating handle $13_4$ and is positioned on the receiving container b by means of a suitable mounting.

When the operator wishes to take a sample of milk, he lowers the duct $13_2$ so as to plunge its lower part into the milk and presses on the lever 10, of the cock R drawing the milk up into the receptacle n.

Once the milk has been brought into the sampling container n, he only needs to press the button $10_2$ so as to lower the flap-valve $6_1$ to be able to collect the milk in a flask placed under this flap-valve $6_1$.

It will be noticed that the sampling thus taken will apply to all the milk poured into the receiving container b, since, before plunging the tube $13_2$ of the telescopic unit into the receiving container, the operator can stir the milk by means of paddles 3 and thus obtain a homogeneous mixture.

The suction duct F is connected to a lid $a_2$ of the tank a by a nipple into which a plug valve 30 is screwed (see FIG. 8).

The plug valve 30 which is screwed into the element $a_4$ comprises a threaded hollow shank $30_1$ having two longitudinal grooves $30_2$ and $30_3$ which are adapted to engage two spurs 31 provided on a flow cock $a_3$ located at the bottom of the tank a to control the drainage of the tank (see FIG. 9).

By withdrawing the valve 30 from the nipple $a_4$, air can then enter freely into the tank a which will allow any milk in the tank to be withdrawn from the tank through a cock $a_3$ provided in the lower part of the tank when the cock $a_3$ is opened with increasing the vacuum in the tank.

The operator wishing to empty the milk from the tank is thus obliged to withdraw the plug valve 30 from the nipple $a_4$ and then to use the plug valve 30 as a wrench to open the drain cock $a_3$.

This particular arrangement thus enables milk to be pumped out of the tank through a cock $a_3$ but obliges the operator to first withdraw the plug valve 30 from the nipple $a_4$ admitting air to the tank before the drain cock $a_3$ can be opened, thus insuring that when the operator connects up a pump to the cock $a_3$ excessive vacuum will not be drawn in the tank which might rupture the tank.

Metal rods 32 are provided under the lid $a_2$ on top of the tank. The rods 32 form a guide to accommodate a ball cock 33 which will rise upwardly to close the suction duct F when the tank a is full of milk thus preventing the milk from being sucked up by the suction duct F when the tank is full or nearly full.

Telescopic tubes 34 and 35 are provided between the lid $a_2$ and the ball cock 33, the tube 34 being attached to the lid $a_2$ and the tube 35 attached to the ball 33, thus preventing drops of milk that splash against the ball from being sucked through the suction duct F.

When the tank is not quite full of milk, the air drawn into the duct F passes into an annular duct or space 36 formed between the two tubes 34 and 35.

On the other hand, when the tank is full of milk the ball 33 rises and at the same time lifts the tube 35 so that it completely surrounds the tube 34. The ball 33 then closes the duct F which prevents the milk from entering the tube F and into the drain-cock receptacle G (see FIG. 6).

On the other hand, to prevent water vapor contained in the air drawn from the tank from condensing in the various appliances, the suction duct F can be passed close to the engine of the vehicle and the temperature of the air therein thus raised in order to avoid any condensation in the pipe F.

A pipe 20 (see FIG. 6) may also be connected to the top of the tank a and connected to a suction control valve 29 for sucking up the milk directly from a milk can or the like that is too heavy for lifting and pouring into the receiving container b.

The valve 29 consists (see FIG. 7) of a central body 17 at whose ends are threadedly connected a curved tube 18 and a valve body 19 inside of which a closing plug-valve 53 is placed.

The body 17, curved tube 18, valve body 19 and pipe 20 are connected to each other by means of nuts 21 which, at their inner ends, are provided with flanges $21_1$.

Thus, by placing the flanges $21_1$ behind the small collars $17_1$ and $20_1$ on the body 17 and pipe 20, respectively, these parts can be united by screwing the nuts 21 on the threads $18_1$ made at the ends of the other parts (18 and 19).

Annular washers 26 are placed between these various parts thus assembled to afford good seal-tightness to the valve 29.

The suction control valve 29 is provided with an axially disposed spindle 22 which carries the closing plug 53 at its end adjacent the pipe 20. The other end of the spindle 22 extends through a bushing 25 placed in the wall of the curved tube 18. This outer end of the spindle 22 is contacted by one leg of pivoted operating handle 24 which is pivoted about an axis $24_1$.

The valve 29 can assume two positions; one for a rapid intake of the milk and the other for a slower intake. The slow intake position is used when very little milk remains at the bottom of a can, thus preventing a large quantity of air from penetrating into the tank at the moment when all the milk in the can has been sucked up.

The closing device consists of a plug-valve 53 fixed to the end of the rod 22 which normally bears on a seating $54_1$ which is formed on a nipple 54 positioned within the valve body 19 and the pipe 20. A first spring 55 is placed between the plug-valve 53 and a nut 23 which is screwed onto the end of the nipple 54. A second spring 56 is placed between the nut 23 and a collar 27 positioned adjacent the ends of the tube 17 and valve body 19, the second spring 56 having a greater resistance to contraction than the spring 55.

The nipple 54 is comprised of a seating $54_1$ for the valve 53 and also comprises a flange valve $54_2$ which cooperates with a seating $28_1$ on a collar 28 positioned at the outer end of the valve body 19.

Thus, when the operating handle 24 is fully depressed, the two springs 55 and 56 are both compressed, which enables the liquid to pass at a high flow rate between the flange valve $54_2$ and the seating $28_1$ of the collar 28 and also between the plug-valve 53 and the nipple 54 through the center of the nipple.

When the handle 24 is only half-way depressed, the spring 56 thrusts away the nipple 54 and only the spring 55 is compressed so that the flange valve $54_2$ rests on the seating $28_1$. In this position the liquid passes only between the plug-valve 53 and the seating $54_1$. This position of the valves thus enables the milk to be sucked up from the bottom of the can at a low flow rate reducing the risk of a large quantity of air penetrating into the tank a when the can is empty or nearly empty.

A spring $25_1$ is placed around the spindle 22 so as to bear, on the one hand, on the bushing 25 and, on the other, on a washer $25_2$ held on the spindle 22 by a nut $25_3$ provided with a rubber washer, thus providing a liquid seal around the rod 22 where it extends through the curved tube 18.

It should be noted, however, that the suction valve 29 can be either a complementary member, and in this case the milk collecting truck additionally includes all the devices shown in FIG. 1, or else it can alone form the member enabling the milk to be sucked up inside the tank with the receiving container b and the receptacle n then being eliminated.

The milk collecting device of the present invention enables milk to be collected from production points in an automatic, simple and hygienic manner, and also enables, owing to the vacuum effected inside the tank a, the milk to be degasified, which is most important as it increases the time period during which milk can be kept before spoiling.

Obviously, the invention is not restricted to the examples of embodiment described and shown above, and other forms and methods of embodiment can be provided without going outside of the scope of the invention for that purpose.

What is claimed as new and desired to be secured by Letters Patent of the United States is:

1. A vehicle for collection of milk and other liquids comprising a tank, means communicating with said tank for drawing a partial vacuum in said tank, milk receiving means for receiving milk to be transferred to said tank, said receiving means having an outlet in communication with said tank, said outlet being positioned at a lower level than the top of said tank, and milk sampling means for extracting a sample of milk received in said receiving means, said milk sampling means comprising a sampling receptacle, conduit means connecting said receptacle to said vacuum drawing means and to said receiving means for drawing a sample of milk from said receiving means into said receptacle, valve means in said receptacle for externally discharging a sample of milk from said receptacle, and control means for controlling the vacuum in said receptacle in order to draw a sample of milk therein.

2. A vehicle for collection of milk and other liquids comprising a tank, means communicating with said tank for drawing a partial vacuum within said tank, milk receiving means for receiving milk to be transferred to said tank by said vacuum drawing means, said receiving means having an outlet communicating with said tank, said outlet being positioned at a lower level than the top of said tank, and milk sampling means comprising a sampling receptacle, a telescopic duct having one end connected to said receptacle and its opposite end movable to extend into the milk in said receiving means, said sampling receptacle being connected to said vacuum drawing means and having valve means for externally discharging a sample of milk drawn into said receptacle.

3. A vehicle for the collection of milk and other liquids comprising a tank, vacuum drawing means in communication with said tank for drawing a partial vacuum within said tank, milk receiving means for receiving milk to be transferred to said tank by said vacuum drawing means, said receiving means having an outlet communicating with said tank, said outlet being positioned at a lower level than the top of said tank, a conduit having one end connected to said tank, a valve controlled suction tube connected to the other end of said conduit adapted for insertion into a can containing milk to be collected in said tank, said valve controlled suction tube having a pair of valves and control means operatively connected to said valves for simultaneously opening both of said valves in order to collect the milk in said can at a high flow rate until the can is nearly empty and for selectively opening only one of said valves in order to collect the remaining milk in the nearly empty can at a relatively low flow rate.

4. A vehicle for collection of milk and other liquids comprising a tank, means communicating with said tank for drawing a partial vacuum within said tank, milk receiving means for receiving milk to be transferred to said tank by said vacuum drawing means, said receiving means having an outlet communicating with said tank, said outlet being positioned at a lower level than the top of said tank, an external vent valve on said tank and a drain valve adjacent its bottom, said vent valve comprising a vent passage communicating with the atmosphere, plug means movable into and out of said passage for opening and closing said drain valve, said plug means having wrench means defined thereon, said drain valve having spurs thereon for operatively opening and closing said drain valve, said wrench means being adapted for engagement with said spurs for opening and closing said drain valve.

5. A vehicle for collection of milk and other liquids comprising a tank, means communicating with said tank for drawing a partial vacuum within said tank, milk receiving means for receiving milk to be transferred to said tank by said vacuum drawing means, said receiving means having an outlet communicating with said tank, said outlet being positioned at a lower level than the top of said tank, and milk sampling means comprising a sampling receptacle, a duct having one end connected to said receptacle and its opposite end movable to extend into the milk in said receiving means, said sampling receptacle being connected to said vacuum drawing means and having valve means for externally discharging a sample of milk drawin into said receptacle.

6. A vehicle for collection of milk and other liquids comprising a tank, means communicating with said tank for drawing a partial vacuum within said tank, milk receiving means for receiving milk to be transferred to said tank by said vacuum drawing means, said receiving means having an outlet communicating with said tank, said outlet being positioned at a lower level than the top of said tank, milk sampling means comprising a sampling receptacle, a telescopic duct having one end connected to said receptacle and its opposite end movable to extend into the milk in said receiving means, said sampling receptacle being connected to said vacuum drawing means and having valve means for externally discharging a sample of milk drawn into said receptacle, a paddle in the milk receiving receptacle for stirring the milk before sampling and an operating handle connected to said paddle extending outside of said receiving means.

7. A vehicle for collection of milk and other liquids comprising a tank, means communicating with said tank for drawing a partial vacuum within said tank, milk receiving means for receiving milk to be transferred to said tank by said vacuum drawing means, said receiving means having an outlet communicating with said tank, said outlet being positioned at a lower level than the top of said tank, milk sampling means comprising a sampling receptacle, a telescopic duct having one end connected to said receptacle and its opposite end movable to extend into the milk in said receiving means, said sampling receptacle being connected to said vacuum drawing means and having valve means for externally discharging a sample of milk drawn into said receptacle, a paddle in the milk receiving means for stirring the milk before sampling, an operating handle connected to said paddle extending outside of said receiving means, ball valve means in said receiving means, and lever means associated with said ball valve means for opening said ball valve with said paddle when the milk in said receiving means has been stirred.

References Cited in the file of this patent

UNITED STATES PATENTS

| | | |
|---|---|---|
| 2,006,393 | Hapgood | July 2, 1935 |
| 2,126,563 | Lee | Aug. 9, 1938 |
| 2,383,507 | Martin | Aug. 28, 1945 |
| 2,751,123 | Kuhles et al. | June 19, 1956 |
| 2,816,692 | Schade | Dec. 17, 1957 |
| 2,865,391 | Duncan | Dec. 23, 1958 |

FOREIGN PATENTS

| | | |
|---|---|---|
| 722,617 | Great Britain | Jan. 22, 1955 |